US007714697B2

(12) United States Patent
Soleimani et al.

(10) Patent No.: US 7,714,697 B2
(45) Date of Patent: May 11, 2010

(54) TOKEN PASSING PROTOCOL FOR RFID SYSTEMS

(75) Inventors: Mohammad Soleimani, Gaithersburg, MD (US); Victor Hugo Molina, Germantown, MD (US); Martin Strzelczyk, New Market, MD (US); Mark Duron, East Pathogue, NY (US); Ron Boschini, Germantown, MD (US); Jens Arnold, Perry Hall, MD (US); Darrell Pinson, Mt. Airy, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 656 days.

(21) Appl. No.: 11/393,824

(22) Filed: Mar. 31, 2006

(65) Prior Publication Data
US 2007/0229226 A1 Oct. 4, 2007

(51) Int. Cl.
*H04Q 5/22* (2006.01)
(52) U.S. Cl. .................... 340/10.2; 340/10.3; 340/10.4; 340/10.5; 340/825.72; 340/3.2
(58) Field of Classification Search ............... 340/10.2, 340/10.1, 10.4, 825.72, 825.69, 10.3, 10.5; 709/452; 370/395.53, 452, 458, 460
See application file for complete search history.

(56) References Cited

U.S. PATENT DOCUMENTS

| 5,995,019 A | 11/1999 | Chieu et al. |
| 6,107,910 A | 8/2000 | Nysen |
| 6,433,671 B1 | 8/2002 | Nysen |
| 6,531,957 B1 | 3/2003 | Nysen |
| 6,580,358 B1 | 6/2003 | Nysen |
| 6,950,009 B1 | 9/2005 | Nysen |
| 7,075,412 B1 * | 7/2006 | Reynolds et al. ........... 340/10.2 |

FOREIGN PATENT DOCUMENTS

| GB | 2319706 A | 5/1998 |
| GB | 2381211 A | 4/2003 |

OTHER PUBLICATIONS

"Token Ring/IEEE 802.5", Chapter 9 of the Internetworking Technologies Handbook, copyright 1992-2005 to Cisco Systems, 6 pgs.
"Introduction to LAN Protocols", Chapter 2 of the Internetworking Technologies Handbook, copyright 1992-2005 to Cisco Systems, 8 pgs.
European Search Report and Written Opinion of the European Searching Authority for European Application No. 07752952.7 mailed Aug. 14, 2009.

* cited by examiner

*Primary Examiner*—Vernal U Brown
(74) *Attorney, Agent, or Firm*—Glenn Frankenberger; Bartholomew J. DiVita

(57) ABSTRACT

Methods, systems and apparatuses for RFID readers forming a reader network are described. In an aspect of the present invention, a plurality of RFID readers are configured to interrogate tags. Furthermore, the readers are configured to communicate with one another by transferring a token, represented by a signal. Possession of the token enables the reader to access a RF communications medium. Readers can be arranged in a ring configuration, and interconnected via wired links. A secondary token may circulate in the ring in addition to the primary token, to ensure redundancy in the system. A reader waits for a predetermined time interval before accessing the RF communications medium.

18 Claims, 12 Drawing Sheets

TOKEN PASSING PROTOCOL FOR RFID SYSTEMS

BACKGROUND OF THE INVENTION

1. Field of the Invention

The present invention relates generally to radio frequency identification (RFID) systems, and more particularly to systems and methods for communications among networked RFID readers to achieve efficient tag interrogations.

2. Background Art

Radio frequency identification (RFID) tags are electronic devices that may be affixed to items whose presence is to be detected and/or monitored.

The presence of an RFID tag, and therefore the presence of the item to which the tag is affixed, may be checked and monitored by devices known as "readers." Readers typically have one or more antennas transmitting radio frequency signals to which tags respond. Once a reader receives signals back from the tags, the reader passes that information in digital form to a host computer, which decodes and processes the information.

With the maturation of RFID technology, efficient communication between tags and readers has become a key enabler in supply chain management especially in manufacturing, shipping, and retail industries, as well as in building security installations, healthcare facilities, libraries, airports etc.

In some environments, multiple readers may be present. It may be advantageous for a particular group of RFID tags to be interrogated by more than one reader. Various RFID communication protocols enable this functionality. For example, the emerging standardized RFID communication protocol known as Gen 2, allows for RFID tags to be commanded into a number of possible "states," allowing several readers to interrogate the same tag population.

However, when multiple readers simultaneously send out interrogation signals to an overlapping group of tags, this may cause interference between the interrogation signals. As a result, there may be signal conflict and/or signal degradation, resulting in loss of information. The signal degradation is especially prominent when readers are confined to a fixed frequency or a narrow band of frequency, and have limited number of allowed communication channels.

Thus, what is needed are more efficient and reliable ways for multiple RFID readers to efficiently communicate with RFID tags without unwanted interference.

BRIEF SUMMARY OF THE INVENTION

Methods, systems, and devices for operation of RFID readers in a networked configuration are described. The networked readers circulate a token among themselves to efficiently time-multiplex access to a communications medium.

In aspects of the present invention, readers can be arranged in a ring configuration, and interconnected via wired links transmitting token signals. A first reader can "possess" the time interval that it requires to interrogate RFID tags in its read zone. When the first reader has completed an interrogation, it can relinquish access to the RF medium by signaling a subsequent reader, i.e. the first reader passes the token to the subsequent reader. After performing an interrogation, the subsequent reader can pass the token to still another reader. Eventually, the token signal completes a circuit around the ring of readers, and the first reader again possesses access to the RF medium. This process may be repeated as often as desired.

In an example aspect of the present invention, a secondary token may circulate in the ring in addition to the primary token, to provide redundancy in the system. The reader that receives the primary token is allowed to access the RF communications medium immediately, while the reader that receives the secondary token thereby becomes aware that it will possess the primary token next. A secondary token may help in efficient power management and fast operation in a network.

Aspects of the present invention include waiting for a predetermined time interval before accessing the RF communications medium. A length of the predetermined time interval depends on the system environment. A reader is configured to generate a token to keep ring integrity intact, maintaining the process of sequential, time-multiplexed tag interrogation.

In other example aspects of the invention, readers are capable of retaining the token for a variable period of time to allow a second RF system to perform a RF interrogation utilizing the same RF spectrum, and/or to allow readers with higher priority to possess the RF medium for an extended period of time.

Aspects of the present invention include readers arranged in a master-slave configuration, where a master reader can pass a slave token to one or more slave readers. Yet another aspect of the invention includes readers arranged in spatially separated local networks. Groups of readers may operate synchronously even if they belong to spatially separated local loops to mitigate unwanted interference.

In another aspect of the present invention, a reader device is described, which includes various functional modules, such as a timing module, a token interface module, a priority-assignor module, and a synchronization module. The device is configured to carry out the various operational embodiments of the present invention.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 3A:
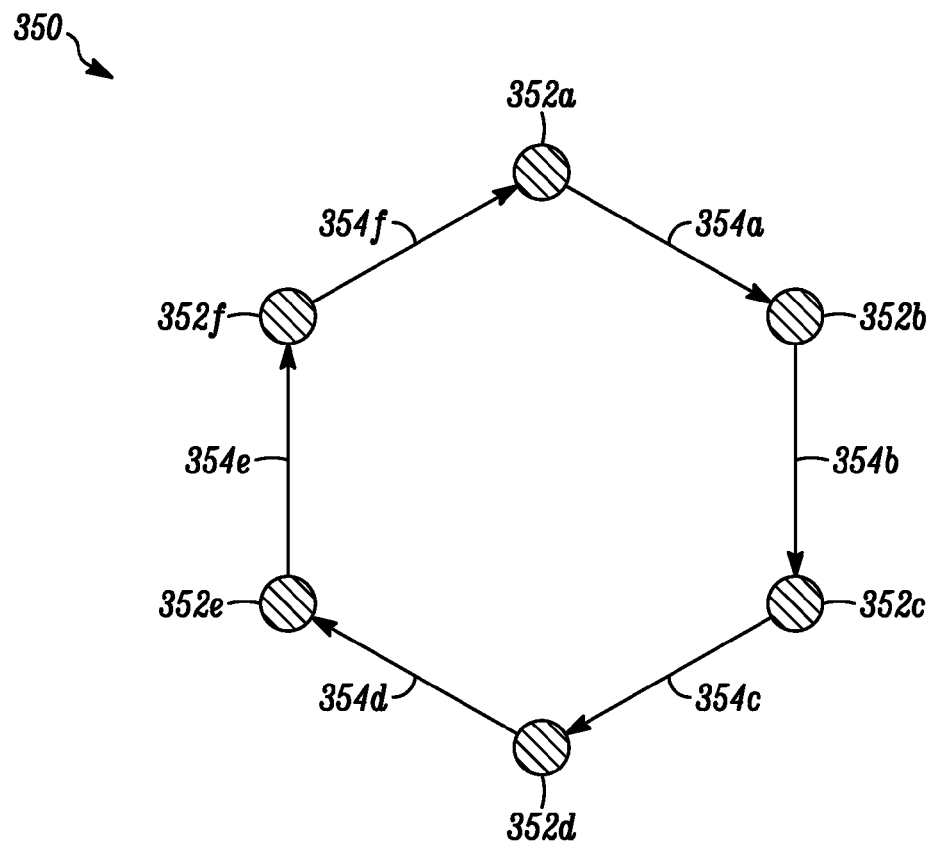
FIG. 3A shows an example token passing ring topology.
Figure 3B:
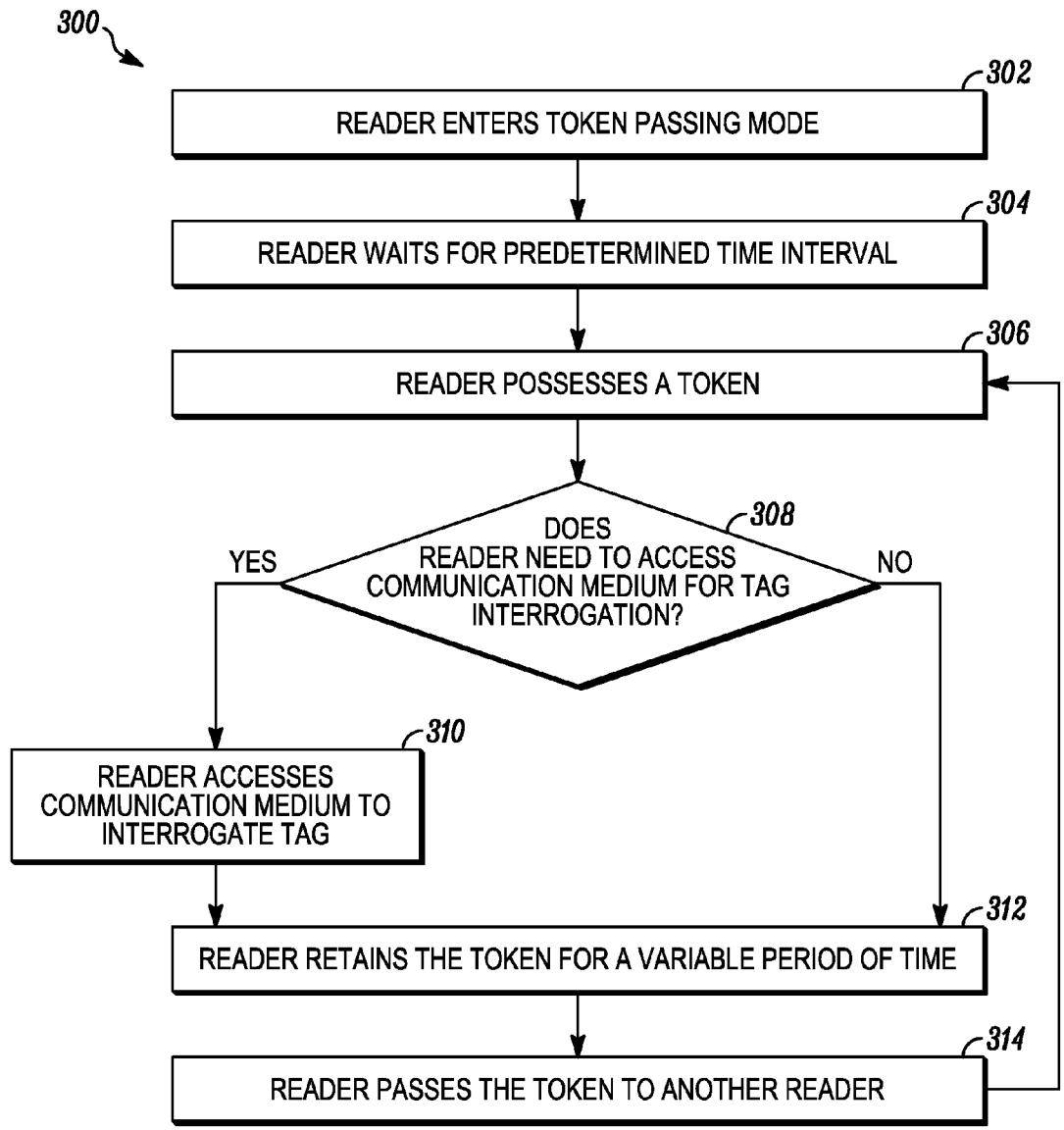
Figure 4:
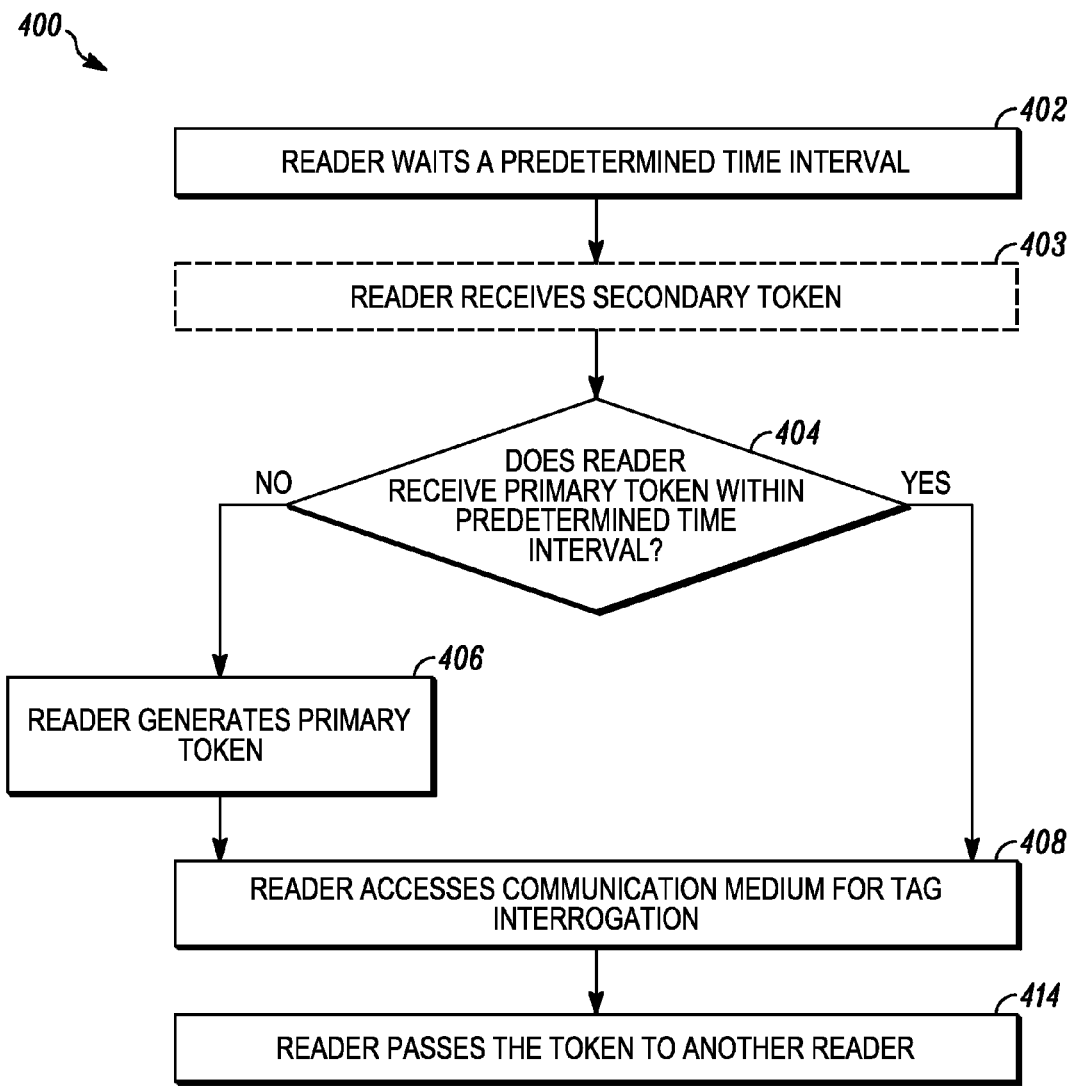
Figure 5:
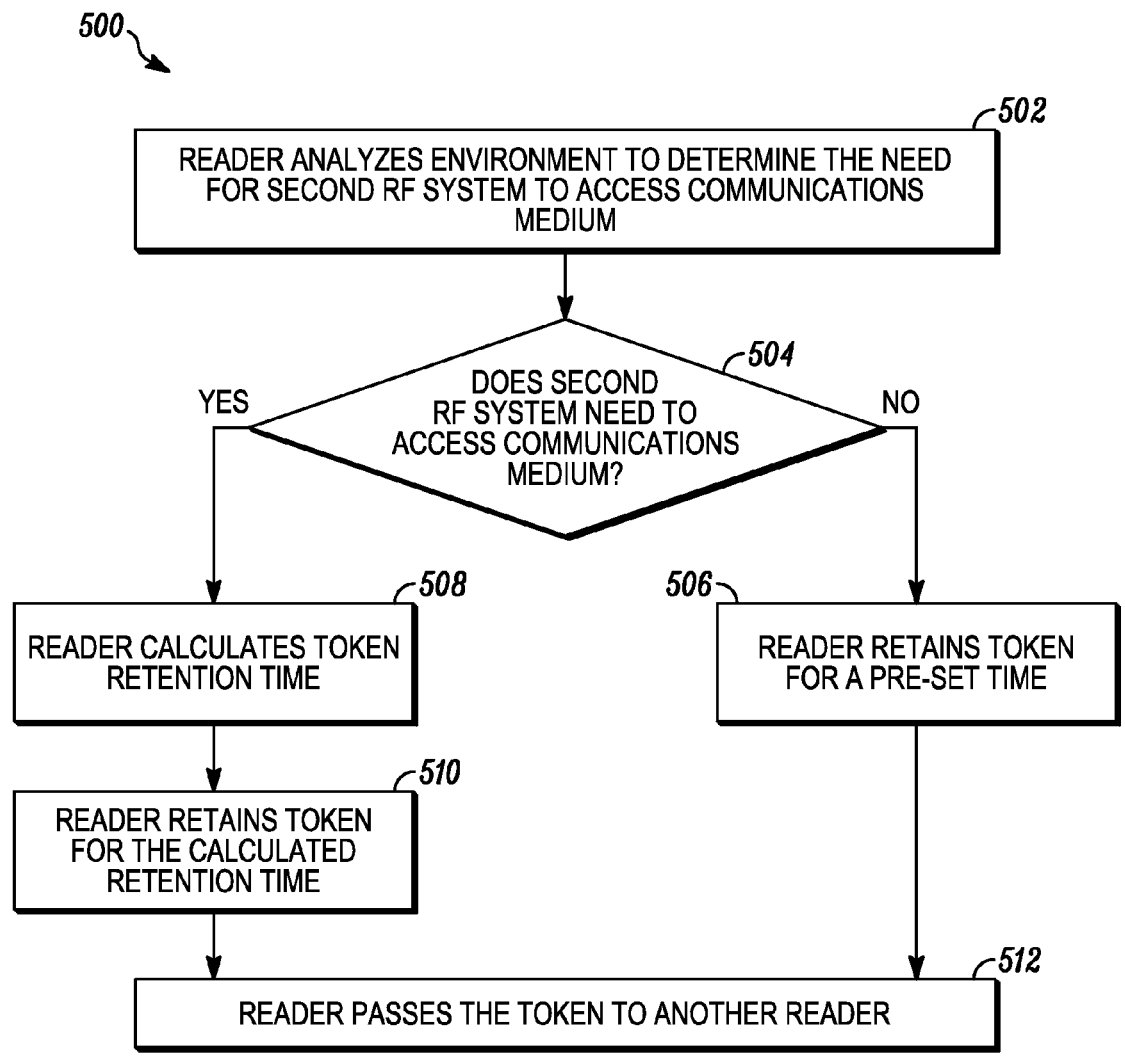

FIGS. 3B, 4, and 5 illustrate flowcharts depicting various methods of operation for efficient tag communication, according to embodiments of the present invention.

Figure 6:
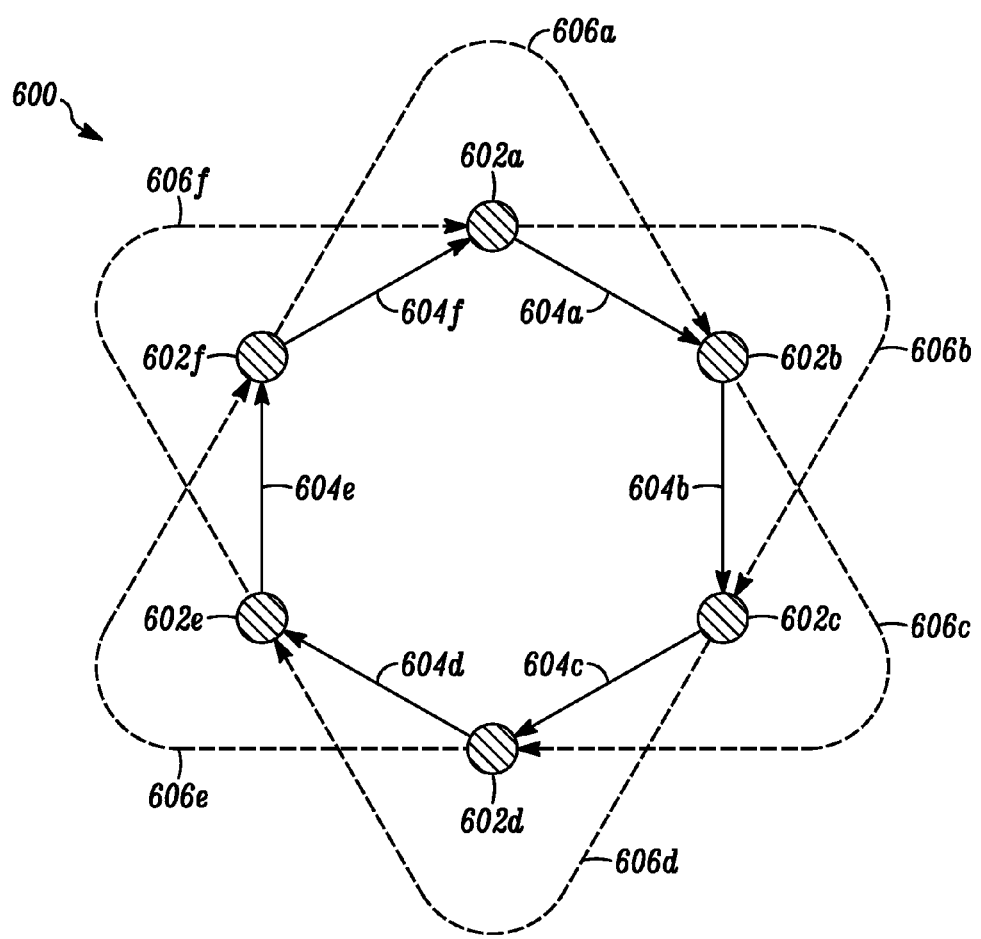

FIG. 6 shows a token loop with redundancy, according to an embodiment of the present invention.

Figure 7:
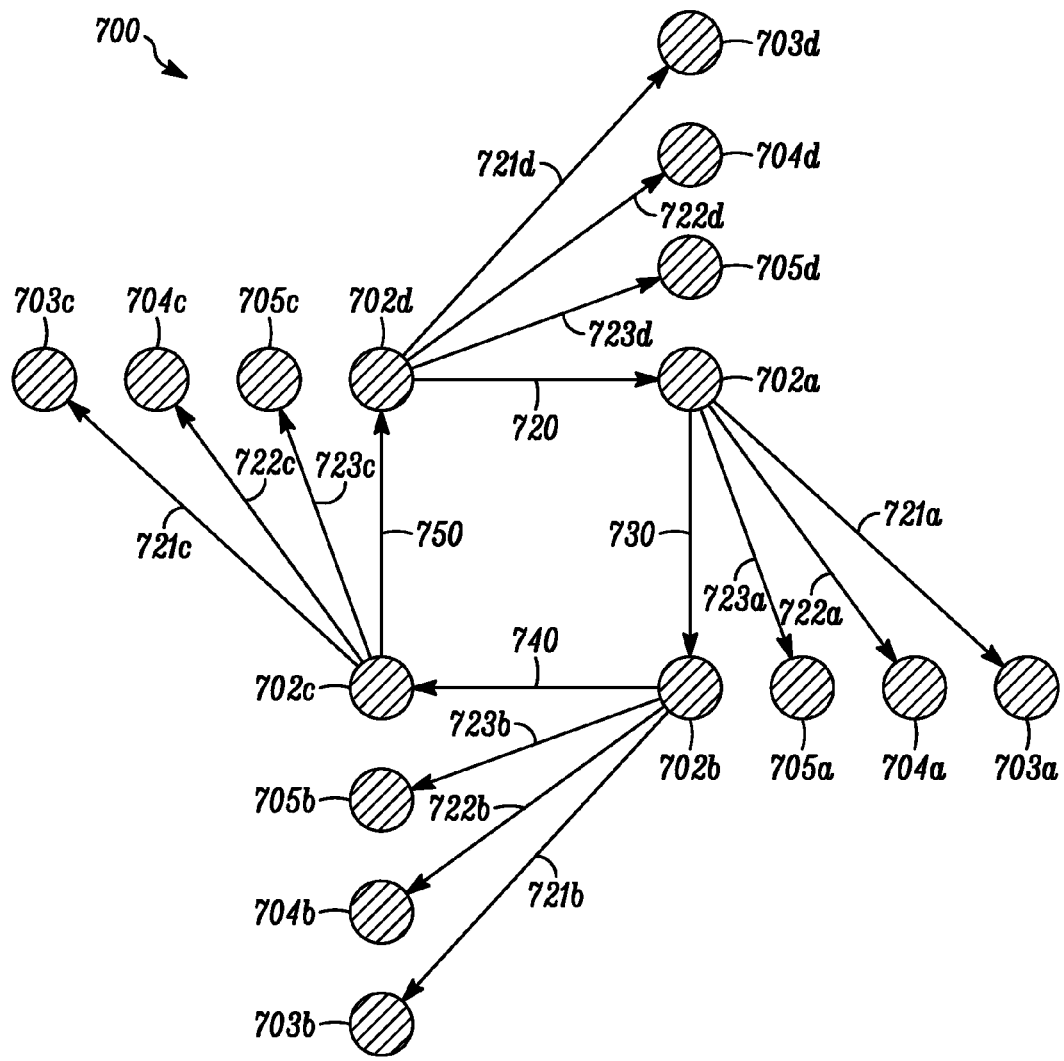

FIG. 7 shows a master-slave reader arrangement, according to an embodiment of the present invention.

Figure 8A:
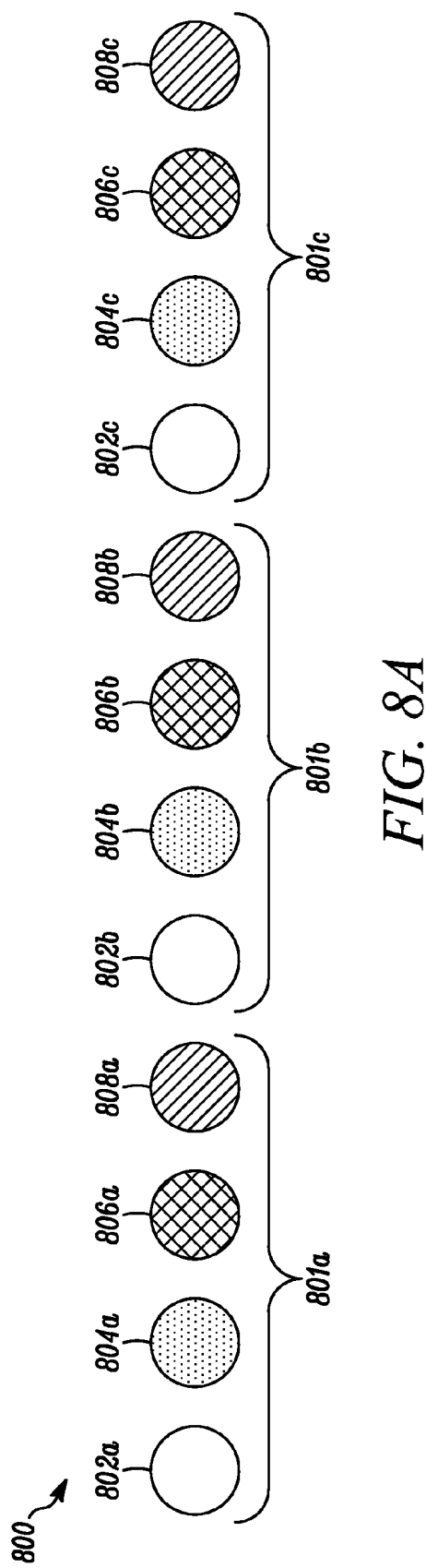
Figure 8B:
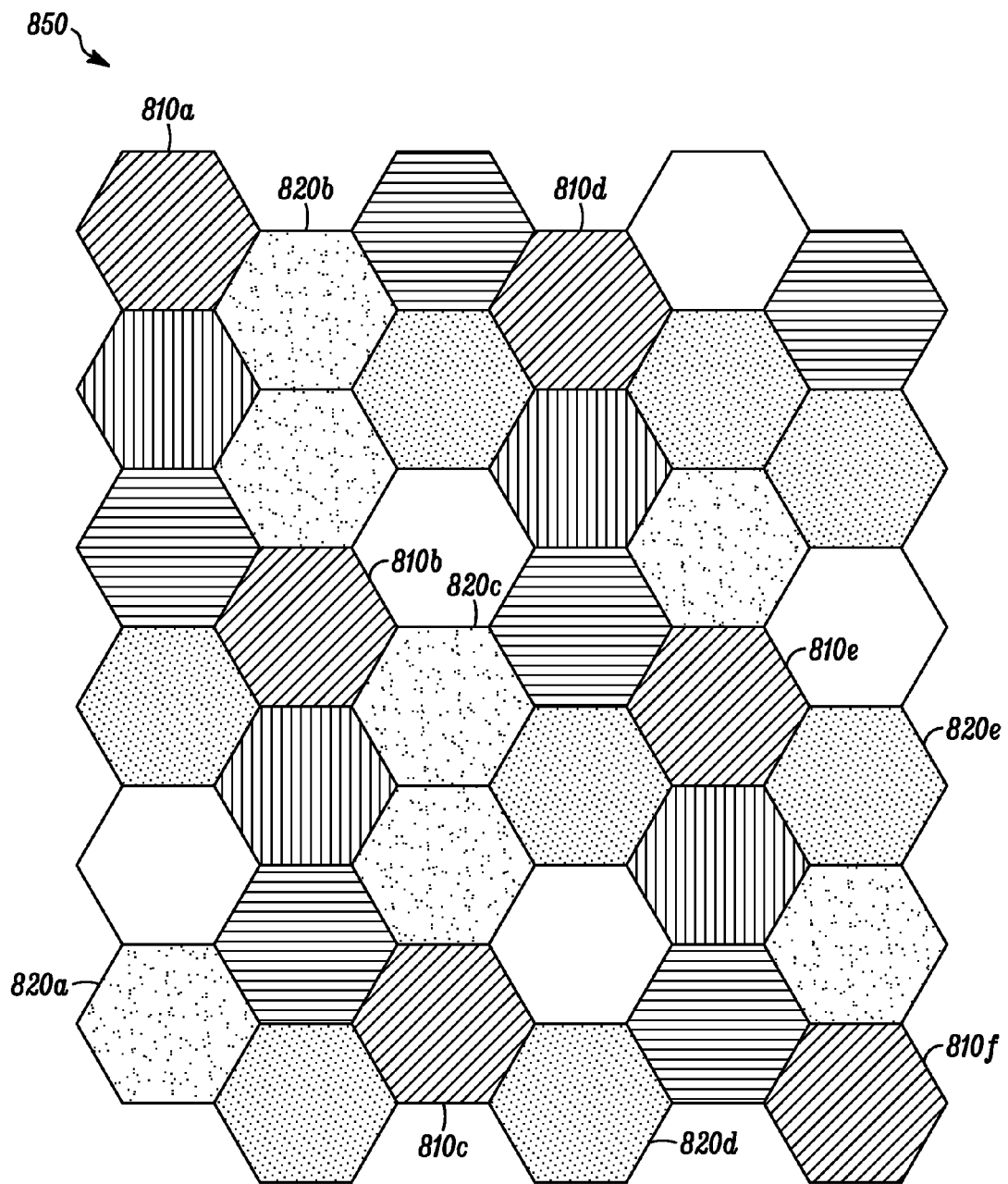

FIGS. 8A and 8B show linear and planar arrangements, respectively, for spatially separated readers synchronized in a group, according to embodiments of the present invention.

Figure 9:
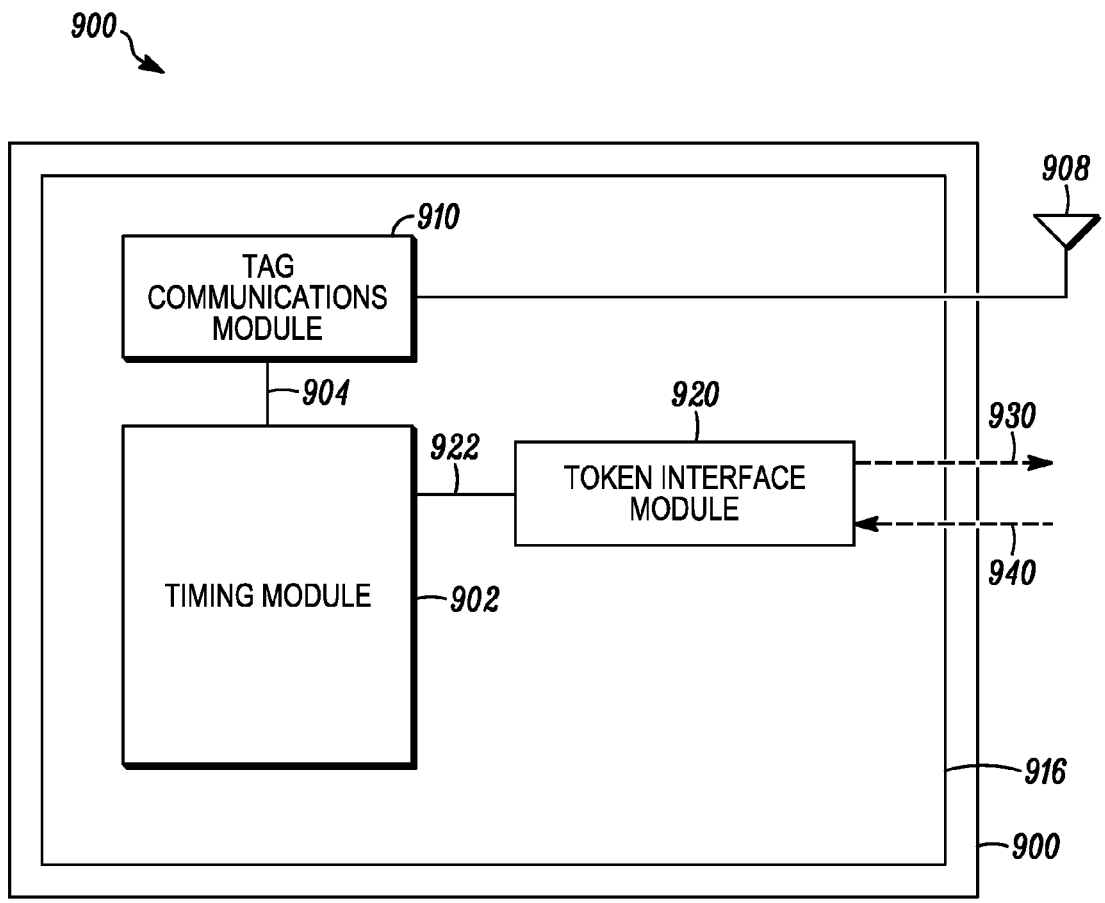

FIG. 9 shows a reader having multiple functional modules, according to an example embodiment of the present invention.

Figure 10:
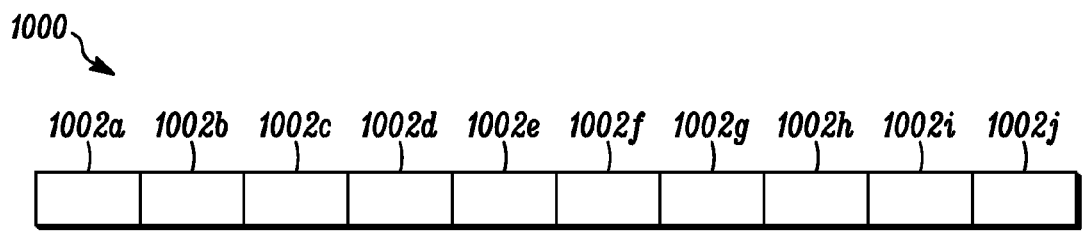

FIG. 10 shows a time chart having a plurality of reader selectable time slots, according to an example embodiment of the present invention.

Figure 11:
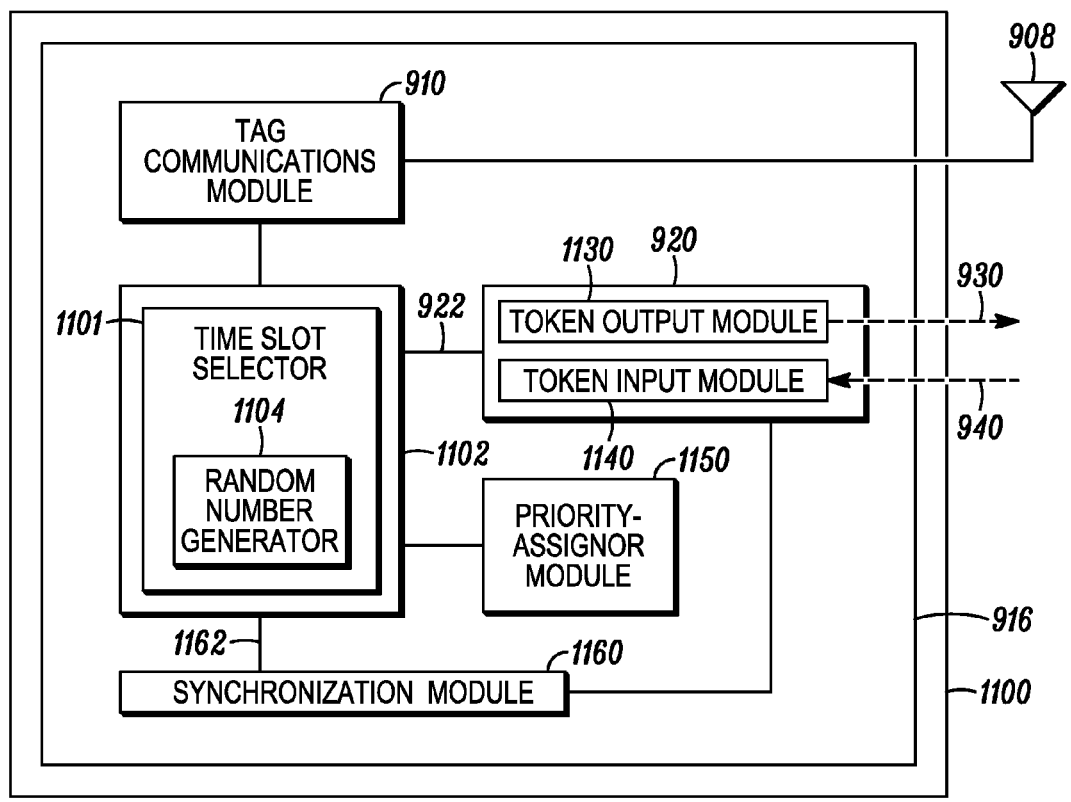

FIG. 11 shows a reader having further exemplary functional modules, according to an embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present invention relates to systems and methods for reader networks, and for optimizing RFID tag interrogations when a plurality of readers desire to communicate with a particular population of tags. According to an embodiment of the present invention, the plurality of readers form a network and communicate among themselves. The reader network incorporates token passing to determine the timing of reader communications.

Figure 1:
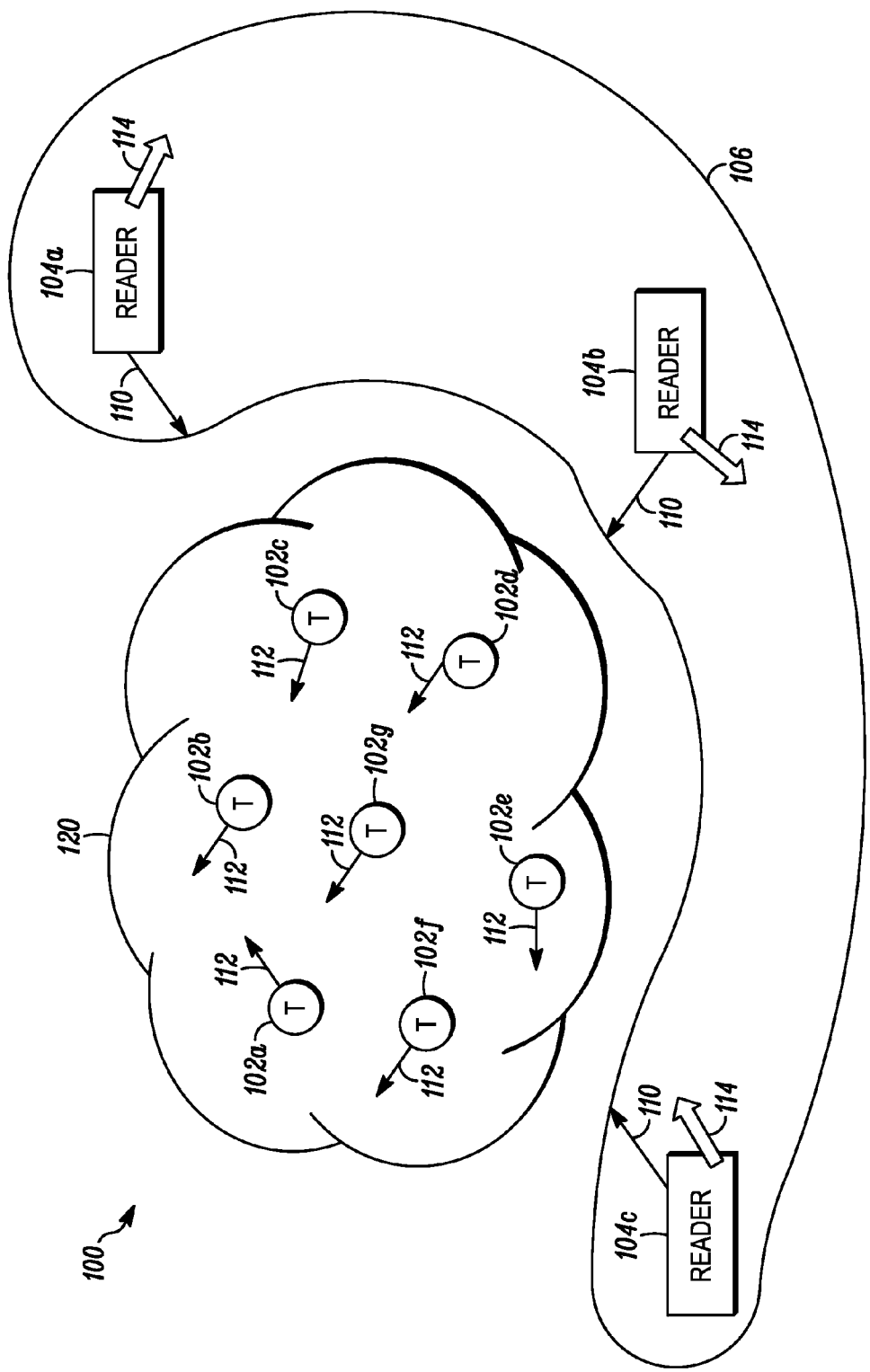
FIG. 1 illustrates an environment where RFID readers communicate with each other as well as with an exemplary population of RFID tags, according to an embodiment of the present invention.

Before discussing details of token passing, an example reader environment is described with respect to FIG. 1. FIG. 1 illustrates an environment 100 where RFID tag readers 104 communicate with an exemplary population 120 of RFID tags 102. As shown in FIG. 1, the population 120 of tags includes seven tags 102a-102g. According to embodiments of the present invention, a population 120 may include any number of tags 102.

Environment 100 includes a plurality of readers 104, such as readers 104a-104c. According to embodiments of the present invention, reader network 106 may include any number of readers 104, including tens, hundreds, or even more of readers 104. Reader network 106 can be referred to as a "dense reader" network, and environment 100 can be referred to as a "dense reader environment," when a large number of readers are operating as members of the network.

In an embodiment, a reader 104 may be requested by an external application to address the population of tags 120. Alternatively, reader 104 may have internal logic that initiates communication, or may have a trigger mechanism that an operator of reader 104a uses to initiate communication.

As shown in FIG. 1, readers 104 transmit an interrogation signal 110 having a carrier frequency to the population of tags 120. Readers 104 operate in one or more of the frequency bands allotted for this type of RF communication. For example, frequency bands of 902-928 MHz and 2400-2483.5 MHz have been defined for certain RFID applications by the Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred to herein as backscatter modulation. Readers 104 receive and obtain data from response signals 112, such as an identification number of the responding tag 102.

In addition to being capable of communicating with tags 102, readers 104a-104c communicate among themselves in a reader network, according to embodiments of the present invention. Each of readers 104a-104c transmits reader signals 114 to others of readers 104a-104c, and receives reader signals 114 from others of readers 104a-104c.

With multiple readers configured to interrogate tags using the same communications medium (air interface in this case), there is a possibility of media contention. Media contention occurs when two or more readers have an interrogation signal to send to the network at the same time. Various techniques are used to allow only one reader to access the network at a time. This is conventionally done in two main ways: carrier sense multiple access collision detect (CSMA/CD) and token passing.

In networks using CSMA/CD technology, such as Ethernet, when a device has data to send, it first "listens" to see if any other device is currently using the network. If not, the device starts sending its data. After finishing its transmission, it listens again to see if a collision occurred. A collision occurs when two devices send data simultaneously. When a collision happens, each device waits a random length of time before resending its data. In most cases, a collision will not occur again between the two devices. Because of this type of network contention, the busier a network becomes, the more collisions occur. This is why the performance of Ethernet systems degrades rapidly as the number of devices on a single network increases.

In token-passing networks such as Token Ring networks and Fiber Distributed Data Interface (FDDI) networks, a token is passed around the network from device to device. A token is a special form of data signal, usually of short length, that contains some sort of control information. In a networking environment, where multiple devices are configured to communicate with the network, possession of the token enables a particular device to transmit data onto the network. The access method by which network devices access the physical medium in an orderly fashion based on possession of the token is known as "token passing".

When a reader has data to send, it must wait until it has the token and then sends its data. When the data transmission is complete, the reader temporarily relinquishes its access to the communication medium, i.e. the token is released to the network. The network then sends signals to the next reader so that next reader may use the communication medium, i.e. the 'token is passed' from one reader to another.

One of the advantages of token-passing networks is that they can be made deterministic, if necessary. In other words, it is possible to calculate the maximum time that will pass before a device has the opportunity to send data. This feature makes the token passing protocol very popular in real-time monitoring operations, such as product tracking in warehouses and process control in factories.

In the 1970s, IBM developed the Token Ring network as a local-area network (LAN) technology based on token passing. As indicated by the nomenclature, the Token Ring network is based on a ring topology. A ring topology is a network topology that consists of a series of network nodes that are connected to one another by unidirectional transmission links to form a single closed loop. A ring topology can be organized as a star implementing a unidirectional closed-loop star.

The Institute for Electrical and Electronics Engineers (IEEE) later developed the IEEE 802.5 specification to be very similar to and completely compatible with IBM's Token Ring network. IEEE 802.5 is a LAN protocol that specifies an implementation of the physical layer and Media Access Control (MAC) sublayer of the data link layer using token passing access at 4 to 16 Mega bits per second (Mbps) over shielded twisted pair (STP) cabling.

A detailed description of the IEEE 802.5 protocol may be found in "Token Ring/IEEE 802.5", Chapter 9 of the Internetworking Technologies Handbook, copyrighted 1992-2005 to Cisco Systems, which is incorporated by reference herein in its entirety.

Figure 2:
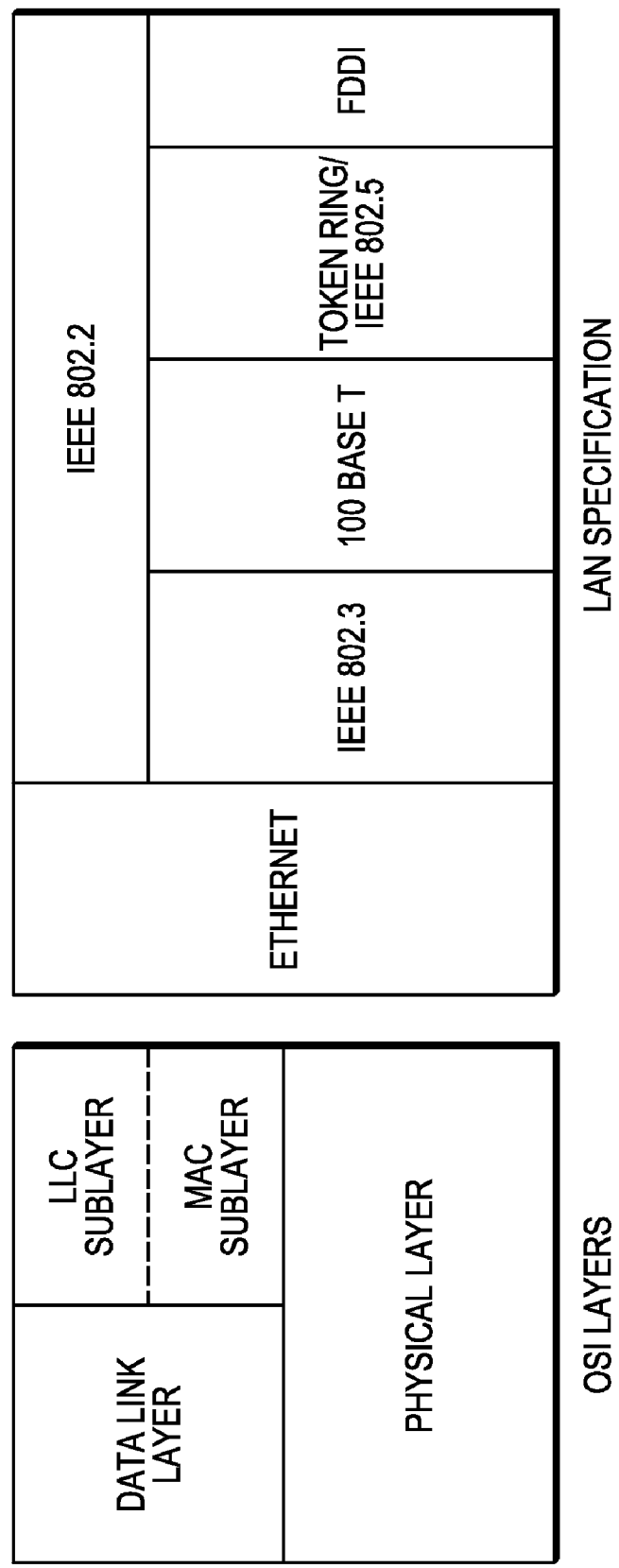
FIG. 2 shows various Local Area Network (LAN) protocols, including conventional token passing protocols, mapped to the Open System Interconnection (OSI) Reference Model.

FIG. 2 shows conventional LAN protocols mapped to the Open Systems Interconnection Reference Model (OSI Reference Model for short). The OSI Reference Model is a layered abstract description for communications and computer network protocol design, developed as part of the Open Systems Interconnect initiative. It is also called the OSI seven layers model. LAN protocols function at the lowest two layers of the OSI model, i.e. between the physical layer, and the data link layer.

In IEEE 802 local area networks, and some non-IEEE 802 networks such as FDDI, the data link layer may be split into a Media Access Control (MAC) layer and the IEEE 802.2 Logical Link Control (LLC) layer, as shown in FIG. 2. A more detailed description of the conventional LAN protocols may be found in "Introduction to LAN Protocols", Chapter 2 of the Internetworking Technologies Handbook, copyrighted 1992-2005 to Cisco Systems, which is incorporated by reference herein in its entirety.

It is noted that though the IBM Token Ring and the IEEE 802.5 topologies exist, embodiments of the present invention differ from the conventional protocols.

For example, one significant difference between embodiments of the present invention and conventional token passing schemes is that the primary purpose of inter-device communication according to embodiments of the present invention is to relay permission to utilize the RF medium from one RFID reader to the next. No actual RF tag interrogation is performed over the wired links connecting the networked devices. In an embodiment, readers are coupled together in the ring topology by wired links for inter-device communication. These wired links may enable various inter-device communication functions, including establishing synchronization, coordinating RF transmissions, and maintaining synchronization robustly among multiple readers. In another embodiment, inter-device communication may take place via wireless links operating at a frequency range different from the tag interrogation RF frequency range.

Additionally, in an embodiment, there is no interposing network adapter or protocol stack (as shown in FIG. 2) between the readers. Synchronization signals are passed that serve to directly trigger RF transmission through air. The readers act upon the synchronization signal in order to achieve contention-less communication with low latency. This allows a set of readers in close proximity to time-multiplex the RF medium in a very efficient manner.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

EXAMPLE READER OPERATIONAL EMBODIMENTS

FIG. 3A shows an example token passing ring topology. A token passing network 350 includes readers 352a-352f arranged in a ring with links 354a-354f coupling readers in the ring. Each of readers 352a-352f accesses a communication medium when in possession of a token, and then passes the token on to the next reader via links 354a-354f. For instance, after accessing the communications medium (e.g. by interrogating a tag), reader 352a passes the token to reader 352b via link 354a.

FIG. 3B shows a flowchart 300 providing steps for example communications in a reader network, according to the present invention. Flowchart 300 relates to an example token passing protocol. The steps of flowchart 300 can be performed by embodiments of readers described herein. Other structural and operational embodiments will be apparent to persons skilled in the relevant art(s) based on the following discussion related to flowchart 300. The steps shown in FIG. 3B do not necessarily have to occur in the order shown.

Flowchart 300 begins with step 302. In step 302, a reader enters the token passing mode. For example, reader 352a of FIG. 3A is configured to operate in a token passing mode.

In step 304, the reader waits for a predetermined time interval. As described in further detail below, in an embodiment, readers in a token passing network do not access the communication medium without coordinating among themselves in order to decrease the likelihood of simultaneous RF transmission. Thus, the readers do not send interrogation signal as soon as they enter the token passing mode, but wait till they possess a token.

In step 306, the reader possesses the token. As elaborated later, a token passing network might have more than one circulating tokens. However, the token that enables a particular reader to access the RF medium is called a "primary token". Unless otherwise mentioned specifically, the terms "token" and "primary token" are used interchangeably herein.

A reader may receive the token from another reader in the token passing network, or the reader may be configured to generate a token, if required. Possession of the token enables the reader to access the communication medium for tag interrogation. However, the reader might not necessarily perform tag interrogation each time it receives a token.

In step 308, the reader determines if it needs to access the communication medium for tag interrogation. If the reader needs to access the communication medium, operation proceeds to step 310. If not, operation proceeds to step 312.

For example, the reader may determine it needs to access the communication medium, if an operator of the reader initiates a read of a tag, the reader receives a remote command to initiate a read of a tag population, or other mechanism triggers the interrogation. In step 310, the reader accesses the communication medium to interrogate at least one tag.

In step 312, the reader retains the token for a variable period of time. In an embodiment, it is not mandatory that a reader passes the token immediately after it has finished its interrogation. Even if the reader does not need to access the communication medium, as determined in step 308, the reader may choose to retain the token for some time, if dictated by the particular situation or network configuration. The retention time can vary from zero to a pre-set maximum interval, for example.

In step 314, the reader passes the token to another reader. For example, in FIG. 3A, reader 352a passes the token to reader 352b. However, reader 352a may be configured to pass the token to a plurality of readers.

Steps 306-314 may subsequently be repeated by the next reader to receive the token. For example, reader 352b repeats the steps 306-314.

Within a token passing network, typically only one instance of a primary token is circulated. However, while possession of the primary token enables a reader to access the communication medium, there may be one or more secondary tokens. The role of a secondary token is typically of advisory nature. For example, a secondary token may alert a reader that it is next in line to receive the primary token.

Flowchart 400 in FIG. 4 further elaborates the concept of a reader waiting for a predetermined time interval before tag interrogation, as described in flowchart 300 with respect to step 312. The steps shown in FIG. 4 do not necessarily have to occur in the order shown.

As shown in FIG. 4, in step 402, a reader waits a predetermined time interval. Upon entering a token passing mode, the reader listens for incoming signals for a variable period of time. The variable period of time can be predetermined to be greater than the length of the ring cycle time, i.e. the time required for a token to travel around the entire token passing network at least once through each of the plurality of RFID readers in the network.

Step 403 is optional, depending on the particular system configuration. In a system having redundancy, as described below with reference to FIG. 6, a reader may receive a secondary token in step 403. Typically, the secondary token is received before the ring cycle time expires.

In step 404, it is checked whether the reader receives a primary token within the pre-determined time interval. If the reader does not receive a primary token within the predetermined time interval, operation proceeds to step 406. If the reader does receive the primary token, operation proceeds to step 408.

In step 406, the reader generates a primary token, and operation proceeds to step 408.

In step 408, the reader accesses the communication medium for tag interrogation.

In step 414, the reader passes the token to another reader. Note that a reader may be configured to pass the token to a plurality of readers.

Readers in a token passing network may be arranged in any topology, including tree topology, star topology, and ring topology. FIG. 6 shows an example token loop or token ring network 600 with provision for redundancy. Each of the readers in network 600 may interrogate tags wirelessly using RF communication through air. At the same time, there may be separate wired hardware links coupling the readers together. Inter-reader signaling or token passing happens through the real time wired links.

As shown in FIG. 6, network 600 includes readers 602a-602f. There may be any number of individual readers included in the network. Links 604a-604f couple corresponding adjacent readers 602 in network 600, and represent wired links for transferring a primary token. Links 606a-606f represent wired links for transferring a secondary token.

As described before, in an embodiment, the reader that receives the primary token is allowed to access the RF communications medium, while the reader that receives the secondary token becomes aware that it will possess the primary token next. A secondary token may help in efficient power management and faster operation in a network. For example, if a reader goes into power-down mode to save power after finishing its tag interrogation during the previous cycle, receiving a secondary token may trigger powering-up of the device, so that it can perform tag interrogation in the current cycle without much latency after receiving the primary token.

A secondary token may also serve as a tool for ensuring robustness in a redundant system, safeguarding system integrity. A redundant system prevents a single point of failure from shutting down the operation of the entire system. In the event of a primary token link failure, the network will switch to backup option, such as using a secondary token link to keep the system interruption at a minimal level. One or more readers in the network are configured to generate and transfer primary and secondary token signals in a redundant token ring.

In the example embodiment shown in FIG. 6, the primary token is passed from one reader to its adjacent reader, for example, from reader 602a to reader 602b via link 604a, while the secondary token is sent to the reader yet one position further in the ring, for example, from reader 602a to reader 602c via link 606b. As shown in FIG. 6, each primary token link 604 couples adjacent readers, while each secondary token link 606 couples a reader to the second reader coupled in series in the forward direction clockwise in network 600.

If the ring's integrity is intact, reader 602c receives the primary token from reader 602b within a predetermined time period, as described in flowchart 400. However, if the ring is disrupted, for example, if link 604b is broken (due to power failure of reader 602b, or damage incurred by the physical hardware connecting readers 602b and reader 602c), reader 602c, already possessing the secondary token from reader 602a, may reasonably assume that after a predetermined time, it should have received the primary token, and therefore, reader 602c is entitled to transmit tag interrogation signal. As shown in flowchart 400, reader 602c thus generates a primary token, and accesses the communication medium.

The time interval between receiving the secondary token and the primary token is referred to as the "gap time-out".

Another time-out pertinent to the token passing network operation is referred to as the "loop time-out". When a reader does not receive any form of token (neither primary nor secondary) for a sufficiently long period of time, the reader can reasonably assume that it should have received a token, and is entitled to generate a primary token as well. This time interval is known as "loop time-out" and can be predetermined, generated based on the ring network characteristics, or otherwise determined.

In order to ensure that each reader in the token passing network gets to interrogate corresponding tags at least once within a reasonable amount of time (which may vary according to system requirements), the notion of time-budget can be incorporated as an operational feature in each reader. Time-budgeting is a process that determines how long a particular reader can retain a primary token in a token passing network to maintain the overall efficiency of the network operation.

Readers within a ring can be assigned different levels of priority. If a reader has a large number of tags in its read zone, the reader may desire to retain the token for a longer time. Therefore, such a reader may be assigned a higher priority. Similarly, a reader deemed to have a less demanding environment, such as a reader having a lesser number of tags to read, or having a greater allowable time interval between subsequent reads, may be assigned a lower priority.

A reader with a lower priority may be configured to relinquish the token a predetermined number of times ('n' times) without performing an RF interrogation. However, the lower priority reader may be required to interrogate tags at least once when it receives the token for the (n+1)-th time.

Readers with different levels of priority may adjust the token retention time according to their particular requirements. The priority levels may be fixed or may change as the reader's environment changes with time.

In an embodiment, a reader with the highest level of priority retains the token for a "maximum hold-time", which is predetermined. Setting a maximum hold-time helps to prevent missed read opportunities by the lower priority readers caused by higher priority readers monopolizing the air interface. The maximum hold-time can be set to different preset (or determined 'on the fly') values as the reader environment changes.

One of the ways a reader environment may change is if a second RF system consisting of a different set of networked readers and the same or a different set of tags with respect to the present RF system, needs to share the same communication medium. For example, a second RF system may be temporarily brought in for a random inventory checking, while the first RF system has routine inventory checking performed at a regular interval. FIG. 5 depicts a flowchart 500 that describes the operation of a reader in the first token passing network when there is a second RF system introduced in the environment. The steps of flowchart 500 are exemplary, and need not happen in any particular order. There may be additional steps not shown in FIG. 5, which may be apparent to an ordinarily skilled artisan. Flowchart 500 illustrates how it is possible for a reader to create gaps in RF medium utilization.

In step 502 of flowchart 500, a reader checks its environment to determine the need for the second RF system to access the communications medium.

In step 504, if it is determined that the second RF system needs to access the communications medium, then the reader proceeds to step 508.

In step 508, the reader calculates a token retention time. The calculation is based on the requirement of the second RF system. For example, the calculation may take into account one or more of the following: the number of readers in the second RF system, the number of tags in the second RF system, the frequency of interrogation, the priority level of the second RF system, etc. As described further below, a timing module in a reader is capable of calculating the token retention time.

In step 510, the reader retains the token for the calculated retention time. For example, after the reader has completed its interrogations, it can delay the next reader in its loop by not sending the token for the calculated retention time. This step creates an opportunity for the second RF system to utilize the RF medium and RF spectrum. However, the retention time should be less than the maximum hold-time as predetermined by the system.

If it is determined in step 504 that the second RF system does not need to access the communications medium, then the reader proceeds to step 506. In step 506, the reader retains the token for a pre-set time.

In step 512, the reader passes the token to another reader. Thus, the token starts circulating again within the first RF system after allowing the second RF system to perform at least one interrogation.

EXAMPLE SPATIAL ARRANGEMENT OF THE TOKEN PASSING READERS

The token ring described above may be extended to include a master-slave configuration, as depicted in FIG. 7. FIG. 7 shows a network 700 having a master-slave configuration, comprising master readers 702a-702d; slave readers 703a-703d, 704a-704d, and 705a-705d; and links 720, 730, 740, 750, 721a-721d, 722a-722d, and 723a-723d. Link 730 couples master readers 702a and 702b, link 740 couples master readers 702b and 702c, link 750 couples master readers 702c and 702d, and link 720 couples master readers 702d and 702a. Links 721a, 722a, and 723a couple slave readers 703a, 704a, and 705a, respectively, with their corresponding master reader 702a. Links 721b, 722b, and 723b couple slave readers 703b, 704b, and 705b, respectively, with their corresponding master reader 702b. Links 721c, 722c, and 723c couple slave readers 703c, 704c, and 705c, respectively, with their corresponding master reader 702c. Links 721d, 722d, and 723d couple slave readers 703d, 704d, and 705d, respectively, with their corresponding master reader 702d. In such a master-slave configuration, each reader in a ring topology can emit its token passing signal to a plurality of readers, instead of just the next reader in line. Only one of these readers need to be part of a ring topology. In the example arrangement of FIG. 7, readers 702a-702d are part of a token passing loop, with links 720, 730, 740, and 750 being the token transfer links connecting them in a token ring. One or more of readers 702a-702d have a number of slave readers associated with them. For example, readers 703a, 704a, and 705a are configured to act as slaves of the master reader 702a. It is noted that though in FIG. 7, each of master readers 702a-702d are shown to have an equal number of slave readers associated with them, a master reader can have any number of slave readers.

A slave reader receives a token from its corresponding master reader via a corresponding link, and sends the token back to the master reader. The master reader generates a slave token to be transferred to its corresponding slave readers. For example, slave readers 703a, 704b, and 705a engage in receiving and sending slave tokens with master reader 702a only, via links 721a, 722a, and 723a, respectively. A slave reader is typically not enabled to pass the slave token to another slave reader, or to another master reader in the loop. However, in an embodiment, a slave reader can be a secondary master reader for its own set of slave readers.

It is noted that the previously described methods of redundancy, time-budgeting, etc. are applicable to the master-slave configuration.

A token passing network may include one or more local networks, spatially separated from one another, where each of the local networks includes one or more readers that circulate a local token restricted within that local network. One or more of the readers in a local network circulate the primary local token associated with that local network in temporal synchronization with corresponding readers in another local network. Synchronized readers perform tag interrogation simultaneously.

Members belonging to different local networks, but the same synchronization group, are spatially separated to mitigate interference. Spatial separation can manifest in a one-dimensional linear arrangement 800, as shown in FIG. 8A, or in a two-dimensional planar arrangement 850, as shown in FIG. 8B.

For example, in FIG. 8A, a local network 801a includes readers 802a, 804a, 806a, and 808a, a local network 801b includes readers 802b, 804b, 806b, and 808b, and a local network 801c includes readers 802c, 804c, 806c, and 808c. Though belonging to different local networks, readers 802a, 802b, and 802c are synchronized as a group. Thus, readers 802a, 802b, and 802c will each have possession of a respective local token at the same time as each other. Furthermore, they each pass their respective local token to their respective next reader simultaneously (i.e. pass local token to readers 804a, 804b, and 804c, respectively). This holds true for subsequent readers in the local networks.

In a two-dimensional arrangement 850, shown in FIG. 8B, readers 810a, 810b, 810c, 810d, 810e, and 810f are synchronized as a group, even if they are spatially apart, and belonging to different local networks.

Synchronized groups of readers may be arranged in any other configuration, including a three-dimensional stacked configuration.

EXAMPLE APPARATUS EMBODIMENTS

Embodiments of the present invention improve upon existing inter-reader signaling approaches, to better optimize usage of the RF communications medium for improved efficiency of reader to tag communications.

For example, FIG. 9 shows a reader 900 according to an embodiment of the present invention. Reader 900 has at least one antenna 908, and a controller unit 916 that includes various functional modules, including a tag communications module 910 coupled to the at least one antenna 908, a token interface module 920, and a timing module 902 coupled to tag communications module 910.

Token interface module 920 is configured to receive a token signal from another reader through link 940, and transmit a token signal to another reader through link 930. In an embodiment, links 930 and 940 may be wired links capable of transmitting signals with minimal latency.

Timing module 902 monitors communications performed by tag communications module 910. For example, timing module 902 determines how much time elapses during a particular tag interrogation by tag communications module 910. Furthermore, timing module 902 determines how many readers are present in the local environment and how many frequency channels are available. Timing module 902 calculates a desired token retention time using the determined information, as described above with reference to flowchart 500 in FIG. 5.

Timing module 902 provides a timing signal 904 to tag communications module 910 to indicate to tag communications module 910 how long after a tag interrogation the token is passed to another reader. Timing module 902 can be implemented in hardware, software, firmware, and any combination thereof.

It is typically desired to minimize the likelihood of multiple instances of primary token signals from existing within a token ring. Multiple primary tokens result in multiple readers occupying the communications medium simultaneously, defeating the intended goal of the token passing architecture. In an embodiment, when multiple readers can select an occupied frequency channel, upon entering the token passing mode, the readers listens for incoming signal for a random period of time. This random period may be a multiple of an amount of time that is greater than the interval required for a token to travel the entire circuit of reader devices. This creates, in effect, "time slots". For example, FIG. 10 shows a time slot chart 1000 having a plurality of reader selectable time slots 1002a-1002j. In FIG. 10, for illustrative purposes, ten time slots 1002a-1002j are shown, but in embodiments, any number of time slots may be present.

In the present embodiment, when multiple readers contend for a frequency channel that is already in use, each reader selects one of time slots 1002a-1002j, in a random or other fashion. The reader that selects the first slot secures the frequency channel first, and can communicate on the frequency channel first. The reader that selects the earliest slot creates a primary token. The existence of a primary token prevents other readers securing later slots from creating another instance of primary token. Any reader that has selected a later time slot can continue to wait till they receive a token indicating that the frequency channel is clear. In case a primary token signal does not reach a reader after a certain predetermined period of time (e. g. because of link failure or other reasons), the reader may generate a primary token at the beginning of the time slot that it has chosen.

FIG. 11 shows a reader 1100 including at least one antenna 908, a tag communications module 910, a timing module 1102, a token interface module 920, a priority assignor module 1150, and a synchronization module 1160. Token interface module 920 includes token input module 1140, and token output module 1130.

Timing module 1102 includes a time slot selector 1101 to select a time slot for reader 1100, according to an embodiment of the present invention. Time slot selector 1101 is coupled to tag communications module 910, and controls which time slot tag communications module 910 initiates a tag interrogation (or other communication). As shown in FIG. 11, time slot selector 1101 can have a random number generator 1104. Random number generator 1104 may be used to select a time slot in a random manner. Time slot selector 1101 may also have a timer (not shown) for determining when a selected time slot has arrived. Time slot selector 1101 and random number generator 1104 (when present) can be implemented in hardware, software, firmware, and any combination thereof.

As shown in FIG. 11, reader 1100 includes a priority-assignor module 1150, and a synchronization module 1160, both coupled to the timing module 1102. Synchronization module 1160 is also coupled to token interface module 920.

As described before, priority-assignor module 1150 assigns a value representing the priority level to reader 1100 in the network. The token retention time (i.e. the length of time a reader retains a token before transferring it to the next reader) is calculated depending on the priority level of the reader.

Synchronization module 1160 sends a synchronization signal 1162 to timing module 1102. As shown in FIGS. 8A and 8B, spatially separated readers can synchronously interrogate tags. If readers belonging to the same synchronous group (e. g. 802a, 802b, 802c in FIG. 8A) receive the primary and secondary tokens from their respective local networks at different instances of time because of local loop irregularities, then synchronization module 1160 enables timing module 1102 to adjust the token retention time, so that a tag interrogation signal is sent out synchronously with other members of the group.

It is noted that in some embodiments, synchronization module 1160 may not be needed, because inexactness in local loops can actually be helpful in 'settling' the network to a synchronous token state. Readers typically listen for tokens during the entire interval of each slot, and may generate a token at the beginning of each pre-selected slot. Therefore the network is inherently resilient to non-synchronous powering-up to some extent. However, if the local loop inexactness is irregularly high (for example, in case of multiple links failure), then the synchronization module 1160 may be necessary to act to correct potential asynchronous operation that may lead to RF interference.

Token input module 1140 receives one or more token inputs 940 from other readers in the network. Typically, each reader resets its token inputs 940 when it is about to send out a token output signal 930, generated by the token output module 1130, to another reader. Therefore the reader 'forgets' the occurrence of spurious tokens, if any. If a redundant token, such as a secondary token, travels around a loop, it should travel synchronously, which is not a stable condition, due to the non-static nature of RFID interrogation. Synchronization module 1160 is configured to remove multiple and asynchronously traveling tokens to ensure interference-free network operation.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method in a first reader for time multiplexing access to a communication medium in a first radio frequency identification (RFID) communications system that includes a plurality of RFID readers, wherein the method comprises the steps of:
    (a) entering into a token passing mode;
    (b) waiting for a predetermined time interval before accessing the communication medium;
    (c) possessing a token, possession of which permits the reader to access the communication medium for tag interrogation;
    (d) determining whether to access the communication medium for tag interrogation;
    (e) retaining the token for a period of time; and
    (f) passing the token to a second reader, wherein step (e) further comprises determining a time limit, wherein the first reader is enabled to possess the token for a time interval less than or equal to the determined time limit, after which the first reader transfers the token to a second reader in the network, wherein step (e) further comprises:
    analyzing an environment to determine whether a second RFID communications system needs to access the communications medium for tag interrogation;
    calculating a time interval greater than the time required by the second communications system to perform at least one tag interrogation, if it is determined that the second communications system needs to access the communications medium; and
    prior to performing step (f), adjusting a token retention time to be equal to the time interval calculated greater than the time required by the second communications system to perform the at least one tag interrogation.

2. The method of claim 1, further comprising:
    (g) accessing the communication medium if a need to interrogate tags is determined by the reader before performing step (f).

3. The method of claim 1, wherein in step (b), the predetermined interval of time is a multiple of a time interval greater than a cycle time, wherein the cycle time is a minimum time required for a token to be transferred at least once to each of the plurality of RFID readers in the network.

4. A radio frequency identification (RFID) communications system, comprising:
    a plurality of RFID readers that form a token passing network, wherein at least two of the readers are configured to receive and transfer a token for time multiplexing access to a communication medium to perform at least one RF tag interrogation; and
    a primary reader that generates a primary token, possession of which enables a reader to access the communication medium for tag interrogation, and, wherein the primary reader transfers the primary token to another reader in the token passing network,
    wherein the primary reader randomly selects a time slot during which the primary reader is enabled to access the communication medium for tag interrogation.

5. The system of claim 4, further comprising:
    a population of RFID tags, wherein each tag of the population is within the interrogation range of at least one of the RFID readers.

6. The system of claim 4 wherein readers of the plurality of readers other than the primary reader occupy time slots later than the time slot selected by the primary reader, wherein a reader occupying a later time slot is inhibited from generating a primary token as long as a previously generated primary token exists in the token passing network, 7. The system of claim 4, wherein a reader is allowed to generate a token only at the beginning of a pre-selected time slot.

8. The system of claim 4, wherein a reader of the plurality of RFID readers comprises a secondary token generator that generates a secondary token, possession of which alerts a reader that it will possess the primary token next.

9. The system of claim 8, wherein the secondary token is transferred from a first reader to a third reader, bypassing at least a second reader coupled in between the first reader and the third reader.

10. The system of claim 8, wherein a reader possessing the secondary token is allowed to access the communication medium for tag interrogation if a predetermined interval of time has passed, and the reader possessing the secondary token has not currently received the primary token.

11. The system of claim 4, wherein a reader of the plurality of readers is a master reader configured to generate a slave token to transfer to at least one slave reader coupled to the master reader.

12. The system of claim 11, further comprising one or more slave readers configured to receive the slave token from the corresponding master reader, and send the slave token back to the master reader.

13. The system of claim 4, wherein the network comprises:
    one or more local networks, spatially separated from one another, wherein each of the local networks comprises one or more readers that circulate a local token, and
    wherein one or more of the readers in a first local network circulate a first local token in temporal synchronization with readers in a second local network that circulate a second local token, 14. The system of claim 13, wherein temporally synchronized readers are spatially arranged in a one dimensional linear arrangement, two dimensional planar arrangement or a three dimensional stacked arrangement.

15. The system of claim 4, wherein each of the readers is assigned a value corresponding to a priority level in the network.

16. The system of claim 15, wherein a reader with an assigned value indicating a lower priority is configured to pass the token for a pre-determined fixed number of 'n' times without performing an RF interrogation, and wherein the reader is required to interrogate tags at least once when it receives the token for the (n+1)th time.

17. A radio frequency identification (RFID) reader, comprising:
- at least one antenna;
- a tag communications module coupled to the at least one antenna and configured to interrogate tags;
- a token interface module configured to generate and transfer a token to another reader within a token passing reader network; and
- a timing module coupled to the tag communications module and the token interface module, wherein the timing module calculates a desired variable time interval for interrogating tags.

18. The RFID reader of claim 17, wherein the reader further comprises:
- a priority-assignor module, that assigns a value indicating the relative priority level of the reader in the network;
- a synchronization module coupled to the timing module, the synchronization module enabling the reader to synchronize tag interrogation with other readers that are spatially separated.

* * * * *